(12) United States Patent  
Gunji

(10) Patent No.: US 7,626,838 B2
(45) Date of Patent: Dec. 1, 2009

(54) INVERTER CIRCUIT WITH SWITCHING DEADTIME SYNCHRONIZED SAMPLE AND HOLD CURRENT DETECTION

(75) Inventor: Keita Gunji, Ichinomiya (JP)

(73) Assignee: OMRON Corporation, Kyoto (JP)

( * ) Notice: Subject to any disclaimer, the term of this patent is extended or adjusted under 35 U.S.C. 154(b) by 344 days.

(21) Appl. No.: 11/652,458

(22) Filed: Jan. 11, 2007

(65) Prior Publication Data

US 2007/0165431 A1    Jul. 19, 2007

(30) Foreign Application Priority Data

Jan. 13, 2006  (JP)  ............ 2006-005515

(51) Int. Cl.
 *H02H 7/122*  (2006.01)
(52) U.S. Cl. ............ 363/56.04; 363/98
(58) Field of Classification Search .......... 363/98, 363/132, 56.03, 56.04
 See application file for complete search history.

(56) References Cited

U.S. PATENT DOCUMENTS

| | | | |
|---|---|---|---|
| 4,772,996 A | * | 9/1988 | Hanei et al. ............ 363/41 |
| 4,777,578 A | * | 10/1988 | Jahns ............ 363/98 |
| 6,798,161 B2 | | 9/2004 | Suzuki |
| 7,483,279 B2 | * | 1/2009 | Lee ............ 363/41 |
| 2007/0165431 A1 | * | 7/2007 | Gunji ............ 363/98 |

FOREIGN PATENT DOCUMENTS

| | | |
|---|---|---|
| JP | 11-183531 | 7/1999 |
| JP | 3240535 | 10/2001 |
| JP | 3245727 | 11/2001 |
| JP | 2003-164159 | 6/2003 |
| JP | 2003-164192 | 6/2003 |
| JP | 2003-324928 | 11/2003 |
| JP | 2005-1574 | 1/2005 |

* cited by examiner

*Primary Examiner*—Jeffrey L Sterrett
(74) *Attorney, Agent, or Firm*—Osha • Liang LLP

(57) ABSTRACT

In an inverter circuit including switching devices and diodes connected in parallel with the switching devices which are provided in pairs of upper and lower arms, and also including resistances for detecting phase currents in a motor connected to the lower arms, during dead time periods when both a switching device in an upper arm and a switching device in a lower arm are off, a voltage across a phase-current detection resistance induced by a phase current flowing through a diode is sampled.

8 Claims, 12 Drawing Sheets

Pattern A

Pattern B

Pattern C

Pattern B'

INVERTER CIRCUIT WITH SWITCHING DEADTIME SYNCHRONIZED SAMPLE AND HOLD CURRENT DETECTION

BACKGROUND OF THE INVENTION

1. Field of the Invention

The present invention relates to an inverter device for driving a brushless motor used in an electric power steering device in a vehicle, for example, and more particularly, relates to technique for detecting a phase current flowing in a motor.

2. Description of the Related Art

An electric power steering device in a vehicle is provided with a motor such as a 3-phase brushless motor, in order to apply to a steering mechanism a steering aiding force corresponding to a steering torque of a handle. The steering torque applied to the handle is detected by a torque sensor and, according to a detected value thereof, a target value of an electric current to be flowed through the motor is calculated. Then, based on a difference between the target value and the value of the electric current actually flowing through the motor, a command value for feedback control to be supplied to a motor driving portion is calculated. A motor driving circuit includes a PWM circuit for creating a PWM (Pulse Width Modulation) signal having a duty ratio corresponding to the command value, and an inverter circuit including pairs of upper and lower switching devices provided for respective phases, wherein the pairs of upper and lower switching devices are on or off according to the duty ratio of the PWM signal output from the PWM circuit. The inverter circuit outputs voltages for the respective phases corresponding to the aforementioned duty ratio, based on the on/off operations of the switching devices, to drive the motor with the voltages. The electric currents in the respective phases of the motor are detected by determining the voltages at opposite ends of a phase-current detection resistance connected in serial to the switching device, and the detected value is the value of the electric current actually flowing through the motor. Detection of a phase current in such a PWM type motor driving device is described in, for example, Japanese Patent Publication No. 3245727, Japanese Patent Publication No. 3240535, Japanese Patent Application Laid-Open No. 2005-1574, and Japanese Patent Application Laid-Open No. 2003-164159.

Japanese Patent Publication No. 3245727 describes a motor driving device including a 3-phase brushless motor, an inverter circuit for driving the motor, a PWM circuit for performing PWM control on the inverter circuit, and resistances for detecting phase currents flowing through the motor, wherein there is provided a sample-and-hold circuit for sampling and holding voltages across phase-current detection resistances for respective phases, using PWM signals from the PWM circuit as sampling signals, and outputs the sampled-and-held signals as phase-current detection signals.

Japanese Patent Publication No. 3240535 describes provision of a circuit for generating a timing signal in addition to the structure of Japanese Patent Publication No. 3245727, so as to, based on the timing signal from the circuit, start sampling of the voltages across the phase-current detection resistance later than a timing when switching devices in the inverter circuit are on and stop sampling of the voltages across the phase-current detection resistances earlier than a timing when the switching devices in the inverter circuit are off.

Japanese Patent Application Laid-Open No. 2005-1574 and Japanese Patent Application Laid-Open No. 2003-164159 describe that, when the voltage across the phase-current detection resistance can not be detected in any of the phases of the inverter circuit, since the duty ratio of the PWM signal applied to the lower switching device is less than a predetermined value, the phase current in the phase is calculated from the phase currents in the other two phases, by utilizing the fact that the total sum of the respective electric currents in the three phases is zero.

On the other hand, the inverter circuit controlled by the PWM signal includes pairs of upper and lower arms corresponding to the respective phases, each of the arms being provided with a switching device. If a process of switching the switching devices in the upper and lower arms between on/off states involves an instant when both the switching devices are on at the same time, a short circuit may be caused between the upper and lower arms, which may allow an excessive electric current to flow through the respective switching devices, thereby resulting in destruction of the switching devices. Therefore, such that one of the switching devices in the upper and lower arms is off and thereafter the other switching device is on, a time difference called a dead time is provided between the on/off timings of both the switching devices for protecting the switching devices. Such a dead time is described in, for example, Japanese Patent Application Laid-Open No. 2003-324928 and Japanese Patent Application Laid-Open No. 11-183531.

SUMMARY OF THE INVENTION

As described above, the respective switching devices provided in the upper and lower arms in the inverter circuit perform the on/off operations in accordance with the PWM signals, wherein the on time periods and the off time periods of the switching devices are determined by the duty ratios of the PWM signals. In this case, while the switching device in the lower arm is on, an electric current flows through the phase-current detection resistance via this device, but when the switching device in the lower arm is off, no electric current flows through the phase-current detection resistance via the switching device. Therefore, a conventional device detects the phase current based on the voltage across the phase-current detection resistance only when the switching device in the lower arm is on, but does not perform detection of the phase current during the dead time when the switching device in the lower arm is not on.

However, in general, in the inverter circuit, free wheeling diodes are connected in parallel with the respective switching devices as described in the aforementioned Japanese Patent Application Laid-Open No. 11-183531, and, even during the dead time period when the switching device in the lower arm is in an off state, the electric current flows through the phase-current detection resistance via the diode. In focusing on this point, the present invention aims to enable detection of the phase current even during the dead time period to lengthen the sampling period, thus provide an inverter device capable of controlling a motor with higher accuracy.

An inverter device according to the present invention includes an inverter circuit, a PWM circuit and a sample-and-hold circuit. The inverter circuit includes pairs of upper and lower arms provided in association with respective plural phases, the respective arm having a switching device and a diode connected in parallel with the switching device. The lower arm for the respective phase has a phase-current detection resistance for detecting a phase current in a motor, being provided in serial to the switching device. A voltage for driving the motor is extracted from a connection point between the upper and lower arms for the respective phase. The PWM circuit supplies a PWM signal having a predetermined duty ratio to the respective switching device in the inverter circuit. When the switching device in the lower arm is on by the PWM signal from the PWM circuit, the sample-and-hold circuit samples a voltage across the phase-current detection resistance induced by an electric current flowing through the switching device, and samples and holds the sampled voltage. Further, during a dead time period when both the respective switching devices in the upper arm and the lower arm for one of the phases are off, the sample-and-hold circuit samples the voltage across the phase-current detection resistance induced by the electric current flowing through the diode connected in parallel with the switching device in the lower arm, and samples and holds the sampled voltage.

As a specific example, the sample-and-hold circuit performs the sampling during the dead time period, when the duty ratio of the PWM signal supplied from the PWM circuit to the switching device in the upper arm is at least 50% and the duty ratio of the PWM signal supplied to the switching device in the lower arm is less than 50%.

According to the present invention, even during the dead time period when the switching device in the lower arm is off, the voltage across the phase-current detection resistance induced by the electric current flowing through the diode connected in parallel with the switching device is sampled and the voltage is sampled and held to detect the phase current, thereby lengthening the sampling period, to enable detection of the phase current with higher accuracy and enable motor control with higher accuracy.

According to the present invention, when the switching device in the lower arm is on within a period when the switching device in the upper arm is off the voltage across the phase-current detection resistance induced by the electric current flowing through the switching device can be sampled during the period when the switching device in the lower arm is on, and the voltage across the phase-current detection resistance induced by the electric current flowing through the diode connected in parallel with the switching device can be sampled during the dead time period.

In a case where the off time period of the switching device in the upper arm is reduced the switching device in the lower arm is not on within the time period (if the on time period for the lower arm is eliminated due to the dead time), during the dead time period, the voltage across the phase-current detection resistance induced by the electric current flowing through the diode connected in parallel with the switching device in the lower arm can be sampled. Accordingly, even when the switching device in the lower arm is not on, at least the phase current during the dead time period can be detected.

In the present invention, the sample-and-hold circuit can start sampling later than a time point when the switching device in the upper arm is off, and can stop sampling earlier than a time points when the switching device in the upper arm is on. Accordingly, a noise generated at on/off operations of the switching device in the upper arm can be prevented from being sampled and held, thereby improving an S/N ratio to enable more accurate feedback control.

DETAILED DESCRIPTION OF THE PREFERRED EMBODIMENTS

Figure 1:
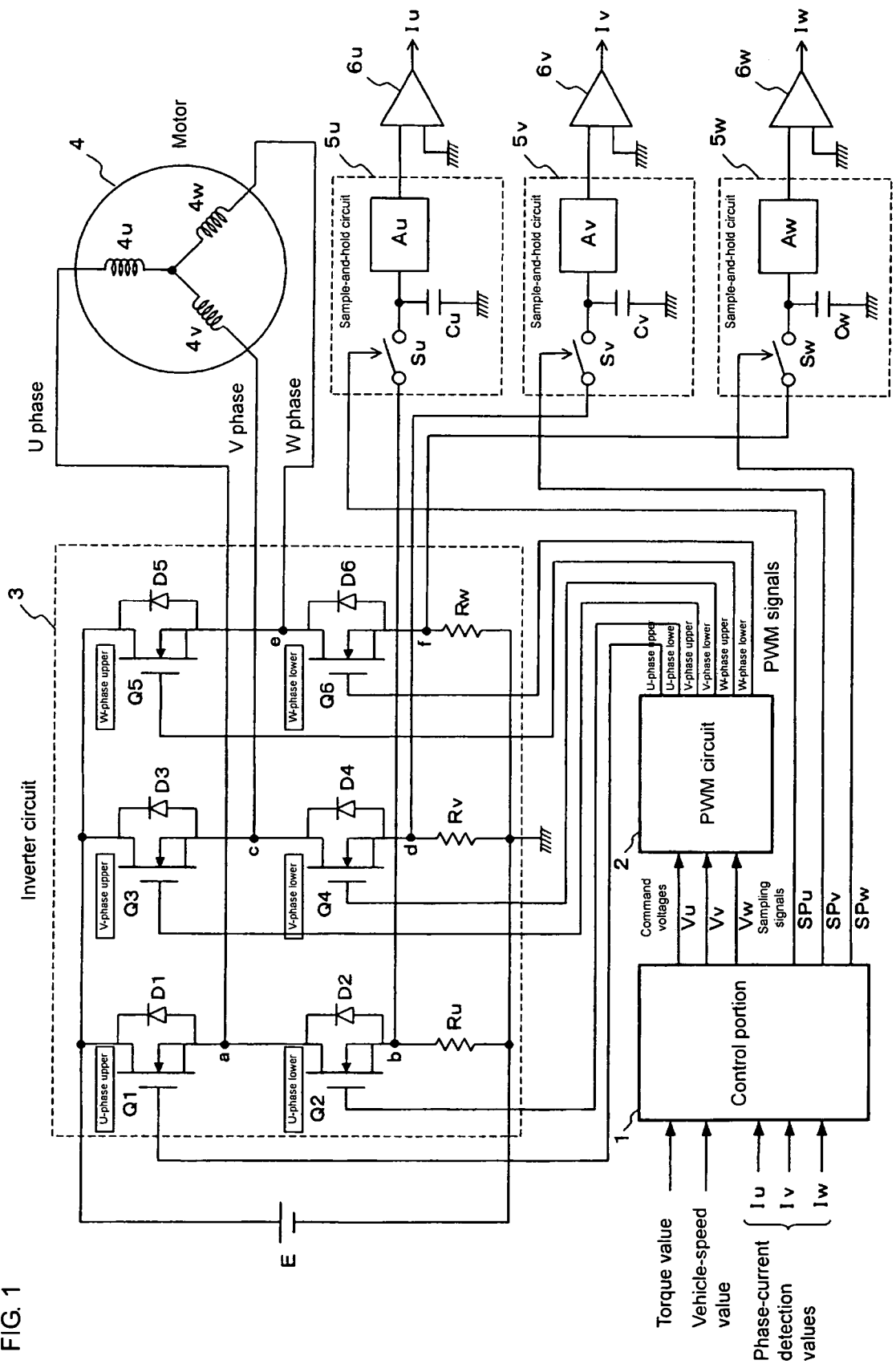
FIG. 1 shows an electrical structure of an inverter device according to an embodiment of the present invention.

FIG. 1 is the electrical structure of an inverter device according to an embodiment of the present invention. 1 is a control portion constituted by a CPU, a memory and the like, 2 is a well-known PWM circuit which outputs PWM signals having predetermined duty ratios based on voltage command signals from the control portion 1, 3 is an inverter circuit which outputs motor-driving three-phase voltages (U-phase voltages, V-phase voltages and W-phase voltages) based on PWM signals from the PWM circuit 2, 4 is a motor which is driven by the three-phase voltages output from the inverter circuit 3, 4u, 4v and 4w are the windings of the motor 4, 5u, 5v and 5w are sample-and-hold circuits which sample voltages for detecting the phase currents over a predetermined period and hold the samples, 6u, 6v and 6w are DC amplification circuits which amplify the outputs of the sample-and-hold circuits 5u, 5v and 5w. The PWM circuit 2, the inverter circuit 3 and the sample-and-hold circuits 5u, 5v and 5w constitute the inverter device.

The inverter circuit 3 is connected between a positive electrode and a negative electrode (ground) of a battery E and converts the DC voltage of the battery E into an AC voltage. The inverter circuit 3 is a well-known circuit and includes pairs of upper and lower arms provided in association with the U phase, the V phase and the W phase, the respective arms including switching devices Q1 to Q6 and free wheeling diodes D1 to D6 connected in parallel with these respective switching devices. The switching devices Q1 to Q6 are constituted by MOS FETs (field effect transistors), but, instead thereof, IGBTs (insulated gate bipolar transistors) or other devices can be employed. The respective gates of the switching devices Q1 to Q6 are individually supplied with 6 types of PWM signals (the U-phase upper arm, the U-phase lower arm, the V-phase upper arm, the V-phase lower arm, the W-phase upper arm and the W-phase arm) from the PWM circuit 2. During the on (high) periods of the PWM signals, the switching devices Q1 to Q6 are on (at a conduction state), while during the off (low) periods of the PWM signals the switching devices Q1 to Q6 are off (at a cut-off state).

Through the on/off operations of the switching devices Q1 to Q6, a U-phase voltage, a V-phase voltage and a W-phase voltage for driving the motor are extracted from connection points a, c and e between the upper and lower arms of the respective phases in the inverter circuit 3 and are supplied to the motor 4. Namely, a U-phase voltage is extracted from the connection point a between the switching devices Q1 and Q2 and is supplied to the U-phase winding 4u of the motor 4. A V-phase voltage is extracted from the connection point c between the switching devices Q3 and Q4 and is supplied to the V-phase winding 4v of the motor 4. A W-phase voltage is extracted from the connection point e between the switching devices Q5 and Q6 and is supplied to the W-phase winding 4w of the motor 4. The motor 4 is constituted by, for example, a 3-phase brushless motor.

There are provided phase-current detection resistances Ru, Rv and Rw for detecting the phase currents in the motor 4, on the lower arms of the respective phases in the inverter circuit 3. The phase-current detection resistance Ru is connected in serial to the switching devices Q1 and Q2, and the voltage generated across the opposite ends of the resistance Ru (the electric potential at a point b) is input to the sample-and-hold circuit 5u. The phase-current detection resistance Rv is connected in serial to the switching devices Q3 and Q4, and the voltage generated between the opposite ends of the resistance Rv (the electric potential at a point d) is input to the sample-and-hold circuit 5v. The phase-current detection resistance Rw is connected in serial to the switching devices Q5 and Q6, and the voltage generated between the opposite ends of the resistance Rw (the electric potential at a point f) is input to the sample-and-hold circuit 5w.

The sample-and-hold circuits 5u, 5v and 5w include switches Su, Sv, Sw, condensers Cu, Cv, Cw and differential amplifiers Au, Av, Aw. When electric currents flow through the phase-current detection resistances Ru, Rv and Rw in the inverter circuit 3 and, thus, voltages to be detected are generated between the opposite ends of the resistances, the switches Su, Sv and Sw are set to on through sampling signals SPu, SPv and SPw from the control portion 1, and the voltages to be detected are sampled in such a way that they charge the condensers Cu, Cv and Cw through the switches Su, Sv and Sw being on. Thereafter, when electric currents no longer flow through the phase-current detection resistances Ru, Rv and Rw and there is a necessity to hold the sampled voltages, the switches Su, Sv and Sw are off to maintain the voltages charged at the condensers Cu, Cv and Cw. The voltages sampled and held as described above are amplified by the DC amplification circuits 6u, 6v and 6w to be output as phase-current detection signals Iu, Iv and Iw. These phase-current detection signals Iu, Iv and Iw indicate the values of actual electric currents flowing through the respective phases of the motor 4.

The control portion 1 calculates the electric currents to be flowed through the respective phases of the motor 4, namely the target values of the motor electric currents for providing a required steering aiding force, based on a torque value detected by a torque sensor (not illustrated) and a vehicle-speed value detected by a vehicle-speed sensor (not illustrated), and makes comparisons between the target values and the phase-current detection values Iu, Iv and Iw to determine the differences therebetween. Then, based on the resultant differences, the control portion 1 calculates command voltages Vu, Vv and Vw for the respective phases which are to be supplied to the PWM circuit 2. The command voltages are parameters for performing feedback control such that electric currents having the target values flow through the windings 4u, 4v and 4w of the respective phases in the motor 4. The PWM circuit 2 creates 6 types of PWM signals having predetermined duty ratios as described above, based on the command voltages, such that a U-phase voltage, a V-phase voltage and a W-phase voltage corresponding to the command voltages Vu, Vv and Vw are supplied to the motor 4. Then, the PWM circuits 2 supplies them to the switching devices Q1 to Q6 in the inverter circuit 3.

Figure 2:
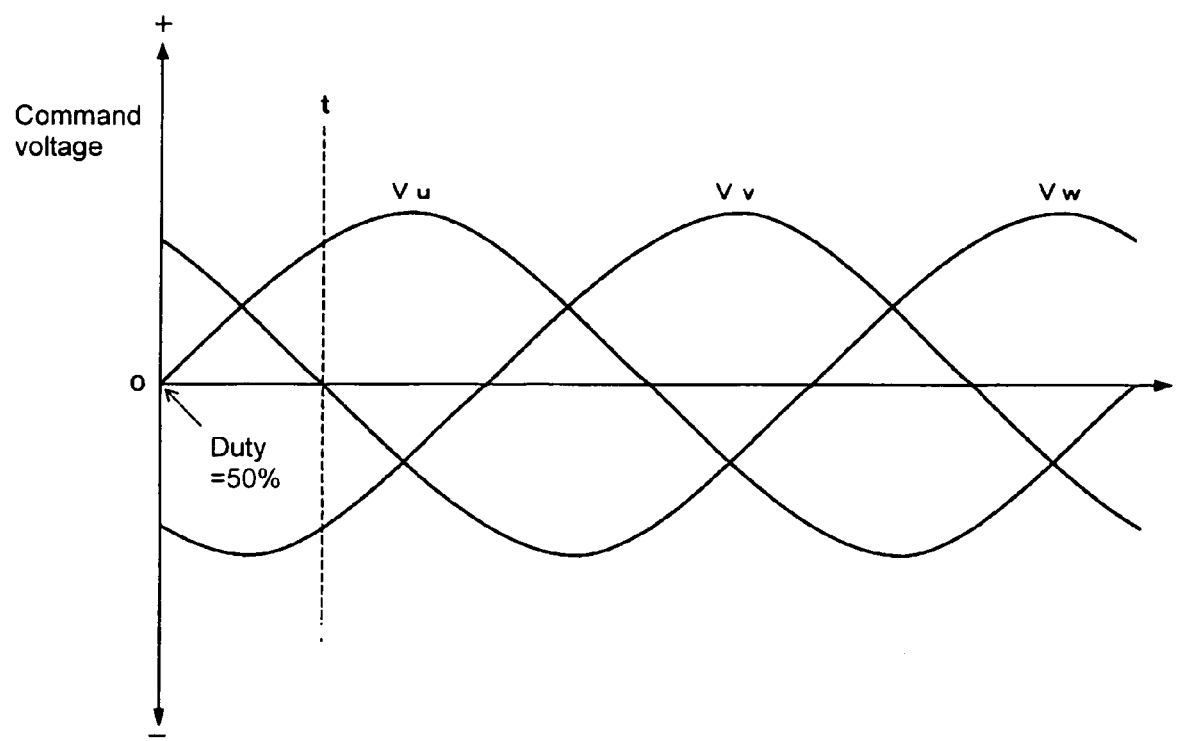
FIG. 2 shows a diagram illustrating signal waveforms of command voltages.

FIG. 2 is a diagram illustrating the signal waveforms of command voltages Vu, Vv and Vw which are supplied from the control portion 1 to the PWM circuit 2. In this case, the values of the command voltages of when the duty ratios of the PWM signals become 50% are 0 volt. Accordingly, when the command voltage values are positive values, the duty ratios of the PWM signals exceed 50%, but when the command voltage values are negative values the duty ratios of the PWM signals are below 50%.

Considering the U-phase command voltage Vu and the V-phase command voltage at timing t in FIG. 2 (the W-phase command voltage is omitted for ease of explanation), for example, the U-phase command voltage Vu has a positive value, but the V-phase command voltage Vv has a negative value, at the timing t. Accordingly, when voltages which equal to the command voltages Vu and Vv are output from the points a and c in the inverter circuit 3, respectively, the electric potential at the point a (the U-phase voltage) in FIG. 1 is positive while the electric potential at the point c (the V-phase voltage) is negative, thereby causing an electric current to flow from the U phase to the V phase. At this time, the PWM signal applied to the U-phase upper switching device Q1 has a duty ratio greater than 50%. For example, if its duty ratio equals to 70%, the ratio between the on time period of the switching device Q1 and the off time period thereof is 7:3. On the other hand, the PWM signal applied to the V-phase upper switching device Q3 has a duty ratio smaller than 50%. For example, if its duty ratio equals to 30%, the ratio between the on time period of the switching device Q3 and the off time period thereof is 3:7.

Next, based on FIGS. 3 to 7, there will be described that there are several types of patterns of the conduction state between the inverter circuit 3 and the motor 4, according to the on/off states of the switching devices Q1 to Q6, prior to description of the detection of the phase currents.

Figure 3:
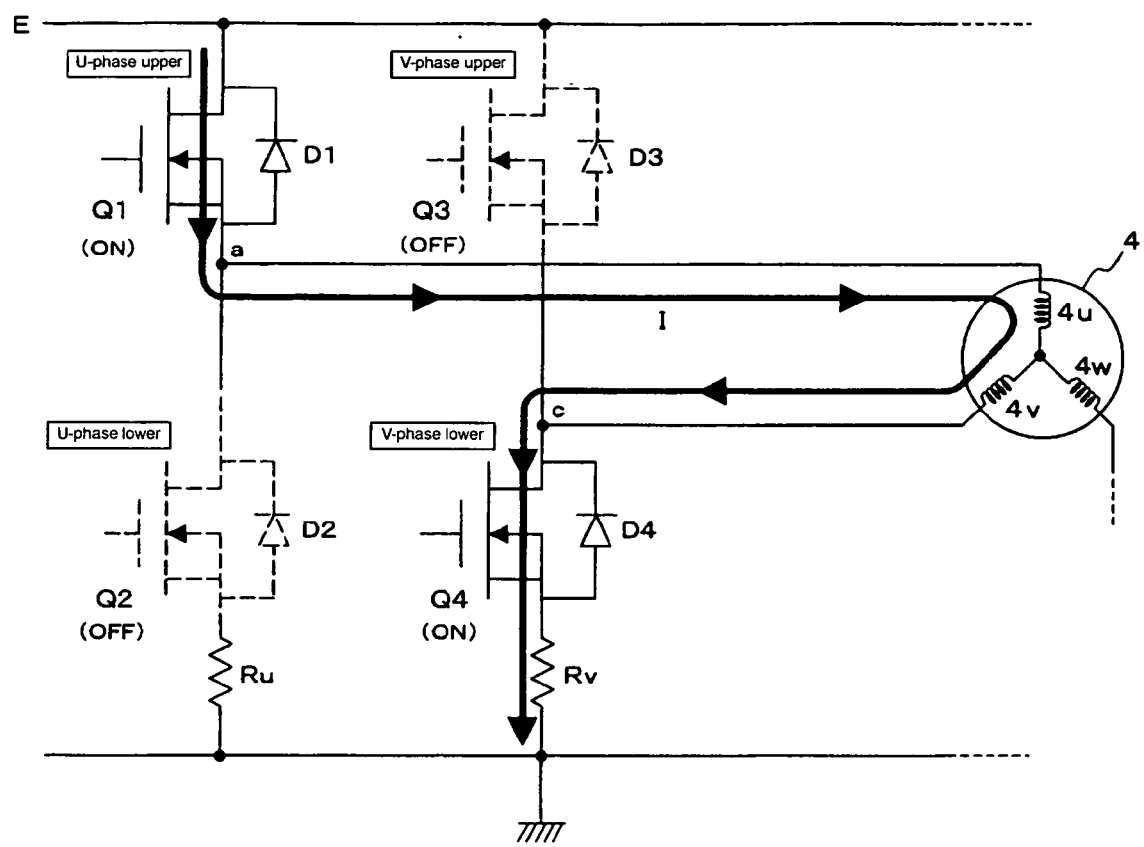
FIG. 3 shows a view for describing a conduction pattern between an inverter circuit and a motor.

FIG. 3 is a view for describing a pattern A, illustrating a partial circuit extracted from FIG. 1. In FIG. 3, there are illustrated the on/off states of the switching devices Q1 to Q4, with a solid line and a broken line. The switching devices Q1 and Q4 illustrated by the solid line are at an on state, while the switching devices Q2 and Q3 illustrated by the broken line are at an off state. The same applies to FIG. 4 and the other later drawings. The pattern A is a pattern of when the switching device (Q1) in the upper arm is on and the switching device (Q2) in the lower arm is off in a single phase (the U phase), while the switching device (Q3) in the upper arm is off and the switching device (Q4) in the lower arm is on in another phase (the V phase). Although the W phase is not illustrated in FIG. 3 for ease, the same relationship as that between the U phase and the V phase is established between the U phase and the W phase and between the V phase and the W phase. The same applies to the other patterns which will be described later. Since the U-phase upper switching device Q1 is on and the V-phase lower switching device Q4 is on in FIG. 3, a phase electric current I flows through a path along the switching device Q1, the U-phase winding 4u in the motor 4, the V-phase winding 4v, the switching device Q4 and the phase-current detection resistance Rv, as designated by a thick arrow, based on the DC voltage of the power supply E.

Figure 4:
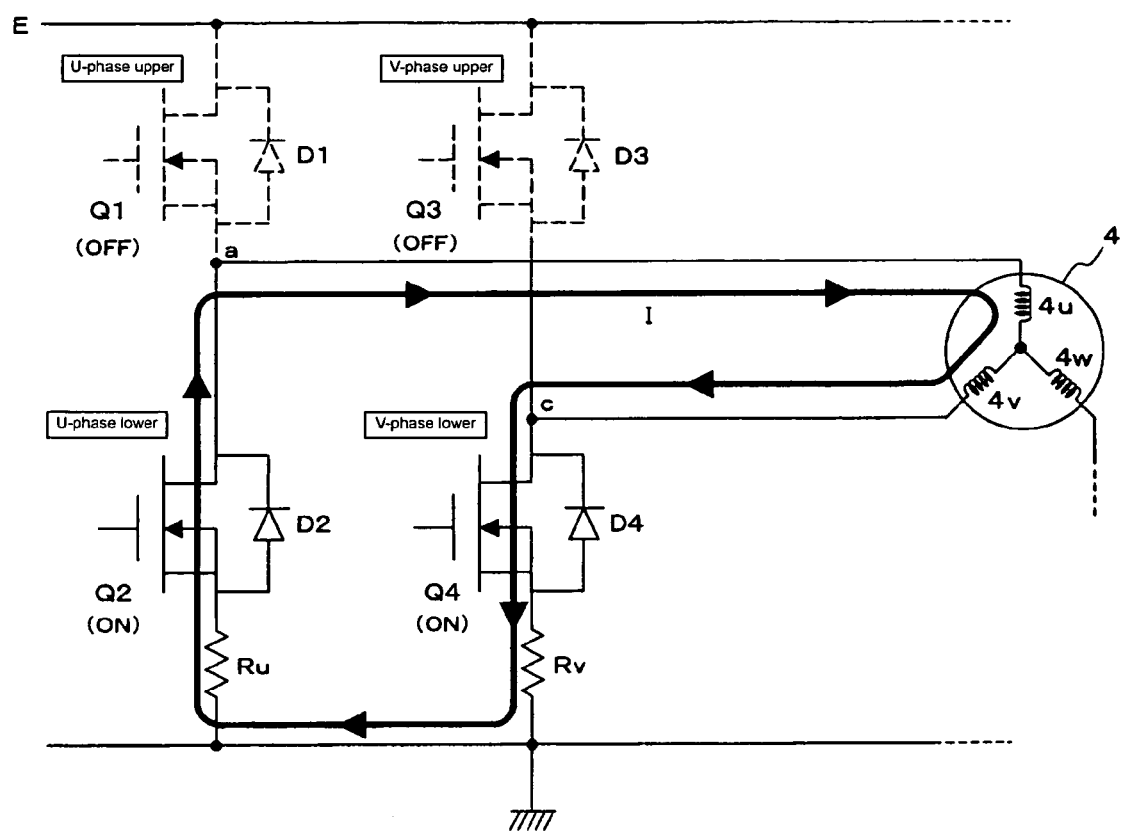
FIG. 4 shows a view for describing another conduction pattern between the inverter circuit and the motor.

FIG. 4 is a view for describing a pattern B. The pattern B is a pattern of when the switching device (Q1) in the upper arm is off and the switching device (Q2) in the lower arm is on in a single phase (the U phase), while the switching device (Q3) in the upper arm is off and the switching device (Q4) in the lower arm is on in another phase (the V phase). Since the U-phase lower switching device Q2 is on and the V-phase lower switching device Q4 is on in FIG. 4, a phase electric current I flows through a path along the U-phase winding 4u, the V-phase winding 4v, the switching device Q4, the phase-current detection resistance Rv, the phase-current detection resistance Ru and the switching device Q2, as designated by a thick arrow, based on the electric energy accumulated in the windings 4u and 4v of the motor 4.

Figure 5:
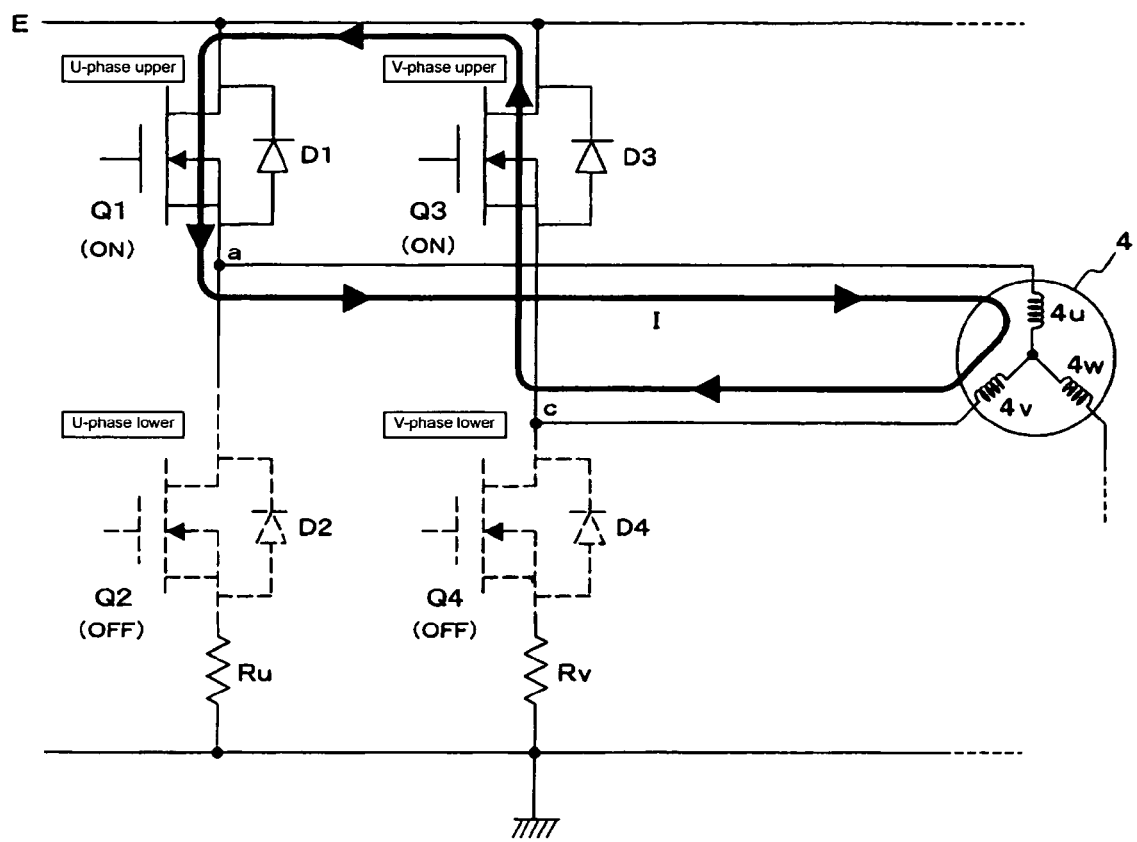
FIG. 5 shows a view for describing still another conduction pattern between the inverter circuit and the motor.

FIG. 5 is a view for describing a pattern C. The pattern C is a pattern of when the switching device (Q1) in the upper arm is on and the switching device (Q2) in the lower arm is off in a single phase (the U phase), while the switching device (Q3) in the upper arm is also on and the switching device (Q4) in the lower arm is off in another phase (the V phase). Since the U-phase upper switching device Q1 is on and the V-phase upper switching device Q3 is on in FIG. 5, a phase electric current I flows through a path along the U-phase winding 4u, the V-phase winding 4v, the switching device Q3 and the switching device Q1, as designated by a thick arrow, based on the electric energy accumulated in the windings 4u and 4v of the motor 4. In a case of the pattern C, no phase currents flow through the phase-current detection resistances Ru and Rv.

There have been described basic patterns of the conduction state of the inverter circuit 3. However, in addition thereto, there are also a pattern B' illustrated in FIG. 6 and a pattern C' illustrated in FIG. 7.

Figure 6:
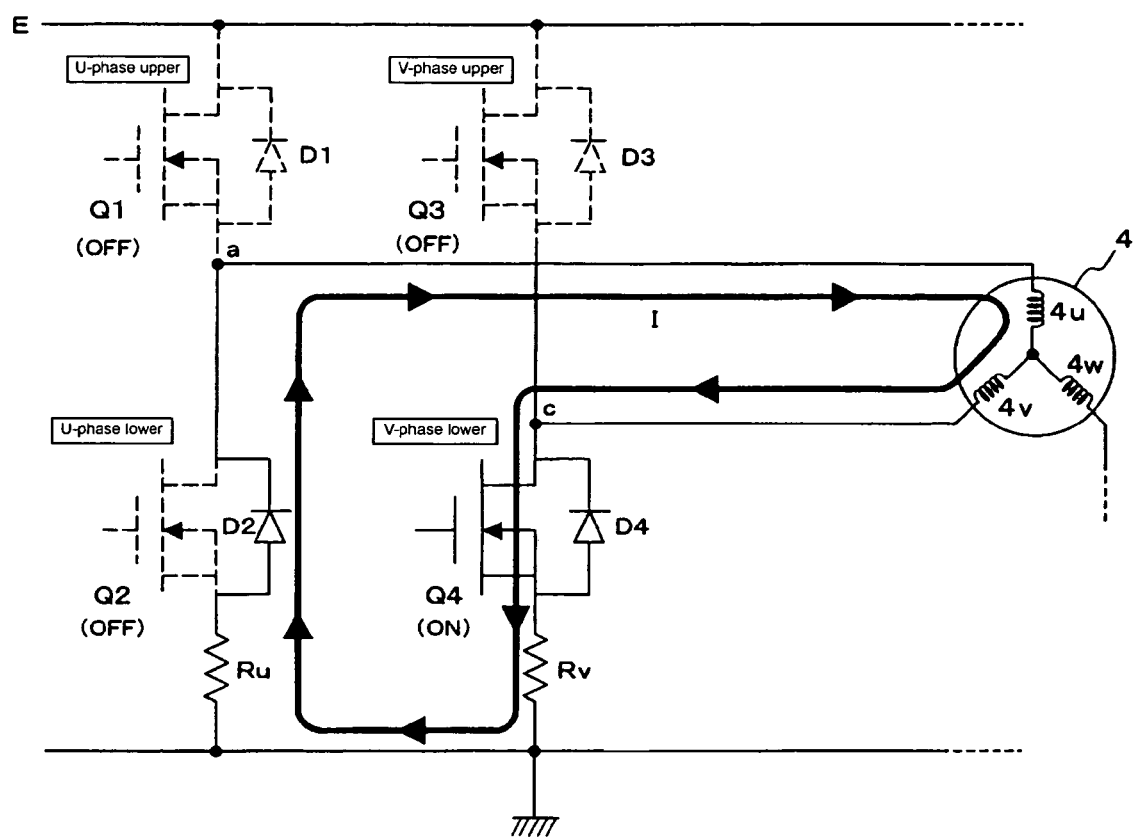
FIG. 6 shows a view for describing still another conduction pattern between the inverter circuit and the motor.

The pattern B' of FIG. 6 is a pattern resulted from modification of the pattern B of FIG. 4. When the conduction state of the inverter circuit 3 is changed from the pattern A to the pattern B or from the pattern B to the pattern A, the on/off states of the U-phase upper switching device Q1 and the U-phase lower switching device Q2 are switched. If the switching involves an instant at which both the switching devices Q1 and Q2 are on at the same time, this may cause a short circuit between the upper and lower arms of the U phase, thereby causing destruction of the switching devices Q1 and Q2. Therefore, as previously described, the states of the switching devices Q1 and Q2 are switched with a dead time period. Therefore, in the process for transition from the pattern A to the pattern B or from the pattern B to the pattern A, there exists a state where both the switching devices Q1 and Q2 in the upper and lower arms of the U phase are off, as illustrated in FIG. 6. In this case, although the switching device Q2 is off, the free wheeling diode D2 connected in parallel with the switching device Q2 is placed in the forward direction with respect to the phase current I, which causes a phase current I to flow through a path along the U-phase winding 4u, the V-phase winding 4v, the switching device Q4, the phase-current detection resistance Rv, the phase-current detection resistance Ru and the diode D2, as designated by a thick arrow, based on the electric energy accumulated in the windings 4u and 4v of the motor 4. Accordingly, in a case of the pattern B', even during the dead time period when both the upper and lower switching devices Q1 and Q2 are off, an electric current flows through the phase-current detection resistance Ru. In the preferred embodiment, the phase currents are detected during the dead time period, using the pattern B'. The details thereof will be described later.

Figure 7:
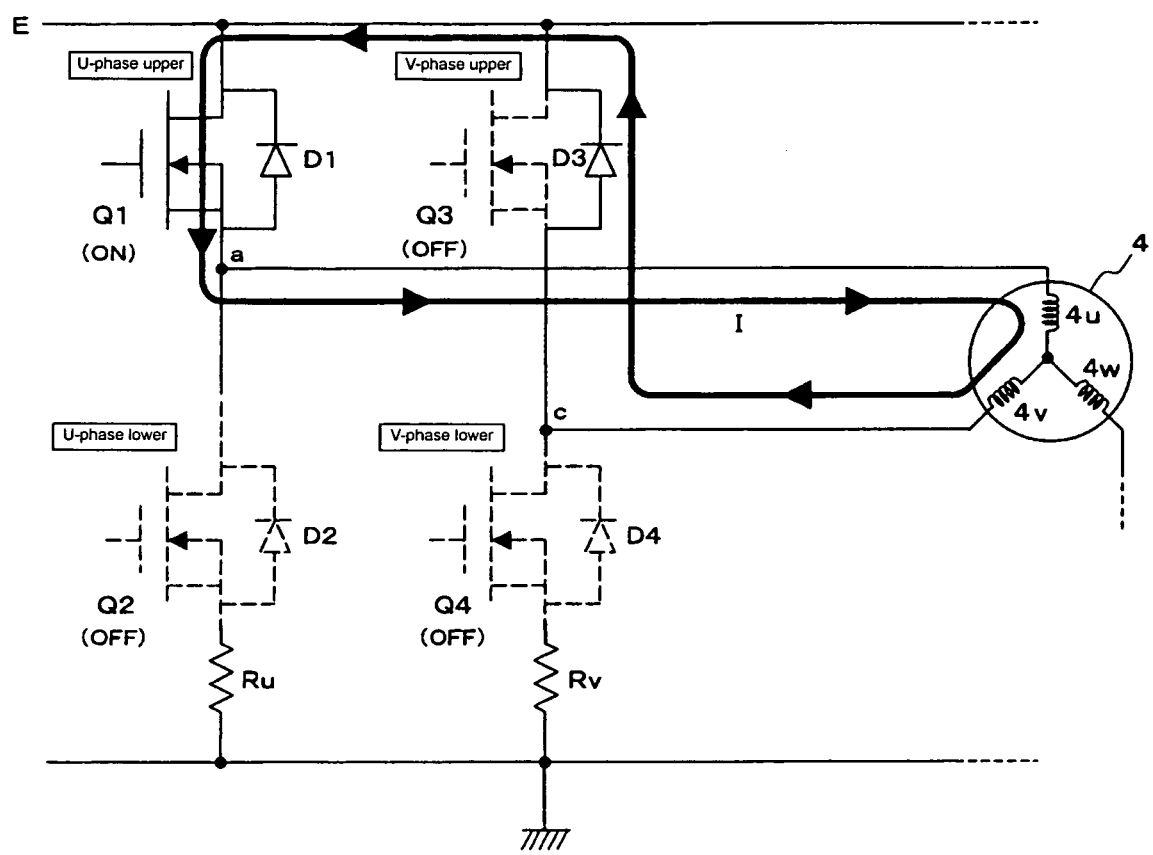
FIG. 7 shows a view for describing still another conduction pattern between the inverter circuit and the motor.

The pattern C' of FIG. 7 is a pattern resulted from modification of the pattern C of FIG. 5. When the conduction state of the inverter circuit 3 is changed from the pattern A to the pattern C or from the pattern C to the pattern A, the on/off states of the V-phase upper switching device Q3 and the V-phase lower switching device Q4 are switched. At this time, similarly, if there is an instant at which both the switching devices Q3 and Q4 are on at the same time, this may cause a short circuit between the upper and lower arms of the V phase, thereby causing destruction of the switching devices Q3 and Q4. Therefore, the states of the switching devices Q3 and Q4 are switched with a dead time period. Therefore, in the process for transition from the pattern A to the pattern C or from the pattern C to the pattern A, there exists a state where both the switching devices Q3 and Q4 in the upper and lower arms of the V phase are off, as illustrated in FIG. 7. In this case, although the switching device Q3 is off, the free wheeling diode D3 connected in parallel with the switching device Q3 is placed in the forward direction with respect to the phase current I, which causes a phase current I to flow through a path along the U-phase winding 4u, the V-phase winding 4v, the diode D3 and the switching device Q1, as designated by a thick arrow, based on the electric energy accumulated in the windings 4u and 4v of the motor 4. In a case of the pattern C', similarly to the pattern C, no phase currents flow through the phase-current detection resistances Ru and Rv.

Next, there will be described a method for detecting the phase currents in the motor 4 in the circuit of FIG. 1. In the following description, there will be exemplified a case of detecting the U-phase current, but the other phase currents can be detected according to the same principle. A phase current flows through the U-phase current detection resistance Ru, only in a case of the pattern B (FIG. 4) and the pattern B'(FIG. 6), among the patterns described in FIGS. 3 to 7. In a case of the patterns B and B', the electric potential at the point a is positive while the electric potential at the point c is negative, which causes a phase current to flow from the U phase to the V phase. At this time, the PWM signal applied to the U-phase upper switching device Q1 has a duty ratio greater than 50%, while the PWM signal applied to the U-phase lower switching device Q2 has a duty ratio smaller than 50%, as previously described.

Figure 8:
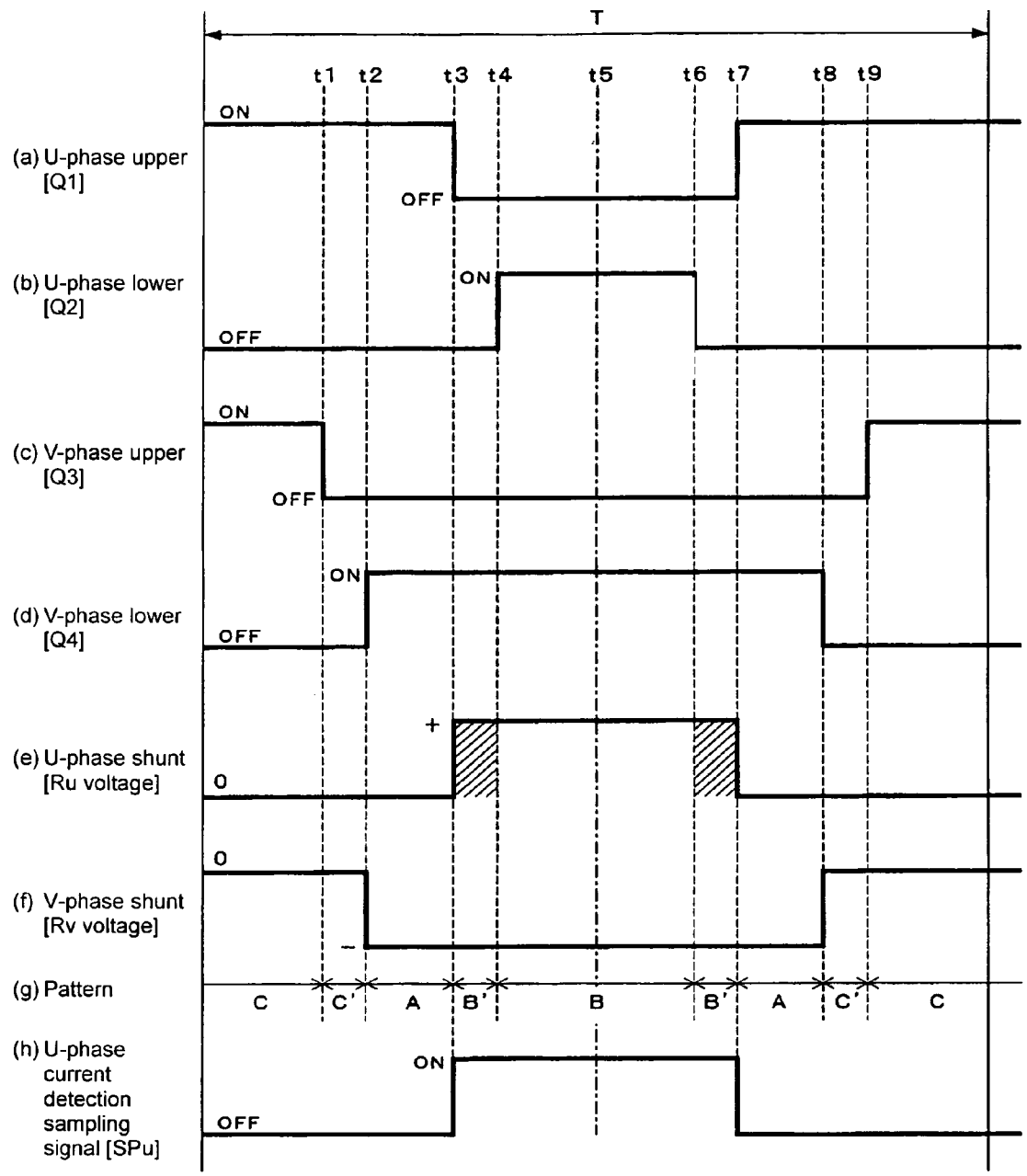
FIG. 8 shows a time chart for describing detection of a U-phase electric current.

FIG. 8 is a timing chart for describing the detection of the U-phase current, illustrating the waveforms of respective signals at the timing t (firmly, a small time period around t) in FIG. 2. In FIG. 8, (a) to (d) indicate the PWM signals supplied from the PWM circuit 2 to the U-phase upper, U-phase lower, V-phase upper and V-phase lower switching devices Q1 to Q4, respectively, (e) indicates the voltage between the opposite ends of the resistance Ru which is generated by the current flowing through the phase-current detection resistance Ru, (f) indicates the voltage between the opposite ends of the resistance Rv which is generated by the current flowing through the phase-current detection resistance Rv, (g) indicates the patterns of FIGS. 3 to 7 corresponding to the respective periods, and (h) indicates sampling signals SPu output from the control portion 1 for detecting the U-phase electric current. Further, T indicates a single period of the PWM signals, and t1 to t9 indicate timings.

Until the timing t1, the U-phase upper switching device Q1 is on and the U-phase lower switching device Q2 is off, while the V-phase upper switching device Q3 is on and the V-phase lower switching device Q4 is off, thereby causing the conduction state pattern to be C (FIG. 5). At this time, no phase currents flow through the phase-current detection resistances Ru and Rv, thereby causing the voltages between the opposite ends of these resistances to be zero, as in (e) and (f). Further, as in (h), no sampling signals SPu are output from the control portion 1.

On reaching the timing t1, as in (c), the V-phase upper switching device Q3 is off, thereby changing the conduction state pattern to C' (FIG. 7). At this time, no phase currents flow through the phase-current detection resistances Ru and Rv, yet, thereby maintaining the voltages between the opposite ends of these resistances at zero, as in (e) and (f). At this time, no sampling signals SPu are output from the control portion 1, yet.

On reaching the timing t2, as in (d), the V-phase lower switching device Q4 is on, thereby changing the conduction state pattern to A (FIG. 3). At this time, no phase current flows through the phase-current detection resistance Ru and, therefore, the voltage between the opposite ends of the resistance Ru is still zero as in (e), while a phase current flows through the phase-current detection resistance Rv, thereby inducing a voltage having a negative polarity between the opposite ends of the resistance Rv, as in (f). Namely, an electric current flows in the direction from the connection point c to the resistance Rv. At this time, no sampling signals SPu are output from the control portion 1, yet.

On reaching the timing t3, as in (a), the U-phase upper switching device Q1 is off, thereby changing the conduction state pattern to B' (FIG. 6). At this time, a phase current flows through the phase-current detection resistance Ru through the diode D2, thereby inducing a voltage having a positive polarity between the opposite ends of the resistance Ru, as in (e). Namely, an electric current flows in the direction from the resistance Ru to the connection point a. Therefore, as in (h), at the time point t3, a sampling signal SPu is output from the control portion 1, which turns on the switch Su in the sample-and-hold circuit 5u, thereby starting sampling of the voltage across the resistance Ru. The time period from the timing t3 to the timing t4 is a dead time period when both the U-phase upper switching device Q1 and the U-phase lower switching device Q2 are off and, in the preferred embodiment, sampling is conducted even during the time period.

On reaching the timing t4, as in (b), the U-phase lower switching device Q2 is on, thereby changing the conduction state pattern to B (FIG. 4). At this time, a phase current flows through the phase-current detection resistance Ru via the switching device Q2, thereby maintaining a voltage having a positive polarity between the opposite ends of the resistance Ru, as in (e). At this time, as in (h), the sampling signal Spu is still output from the control portion 1, thereby causing the sample-and-hold circuit 5u to sample the voltage across the resistance Ru continuously.

Next, on reaching the timing t6 after the timing t5 corresponding to one half of the period T, as in (b), the U-phase lower switching device Q2 is off, thereby changing the conduction state pattern to B' (FIG. 6). At this time, a phase current flows through the phase-current detection resistance Ru via the diode D2, thereby maintaining a voltage having a positive polarity between the opposite ends of the resistance Ru, as in (e). At this time, as in (h), the sampling signal Spu is still output from the control portion 1, thereby causing the sample-and-hold circuit 5u to sample the voltage across the resistance Ru continuously. The time period from the timing t6 to the timing t7 is a dead time period when both the U-phase upper switching device Q1 and the U-phase lower switching device Q2 are off and, in the preferred embodiment, sampling is conducted even during the time period.

On reaching the timing t7, as in (a), the U-phase upper switching device Q1 is on, thereby changing the conduction state pattern to A (FIG. 3), again. At this time, a phase current no longer flows through the phase-current detection resistance Ru, thereby changing the voltage between the opposite ends of the resistance Ru to zero, as in (e). Accordingly, at the time point t7, the control portion 1 stops outputting of the sampling signal SPu, which turns off the switch Su in the sample-and-hold circuit 5u, thereby stoping sampling, and sampling and holding the voltage across the resistance Ru, as in (h). The sampled and held voltage is amplified by the DC amplification circuit 6u to be output as a phase-current detection value Iu.

On reaching the timing t8, as in (d), the V-phase lower switching device Q4 is off, thereby changing the conduction state pattern to C' (FIG. 5), again. At this time, no phase current flows through the phase-current detection resistance Rv, thereby changing the voltage across the resistance Rv to zero, as in (f).

On reaching the timing t9, as in (c), the V-phase upper switching device Q3 is on, thereby changing the conduction state pattern to C (FIG. 7), again. At this time, similarly, no phase current flows through the phase-current detection resistance Rv, thereby maintaining the voltage across the resistance Rv at zero, as in (f).

As described above, in the aforementioned embodiment, a sampling signal SPu is output from the control portion 1 during the time period from t3 to t7 in FIG. 8, the voltage across the phase-current detection resistance Ru generated during this time period is sampled by the sample-and-hold circuit 5u, and the sampled-and-held voltage is amplified by the DC amplification circuit 6u to detect the U-phase electric current.

Conventionally, attention has been focused on the electric currents flowing through switching devices being at an on state in detecting U-phase currents, and no consideration has been given to electric currents which flow during dead time periods. Namely, in detecting a U-phase current, at a time point t4 when the U-phase lower switching device Q2 is on, a sampling signal SPu is output from a control portion 1 to start sampling and, at a time point t6 when the U-phase lower switching device Q2 is off, outputting of the sampling signal SPu is stopped to stop sampling. Accordingly, the sampling period corresponds to the time period from t4 to t6 when the switching device Q2 is on, and the U-phase current only during this time period can be detected.

On the contrary, the preferred embodiment starts sampling at the time point t3 when a dead time period starts and stops sampling at the time point t7 when the dead time period ends, using the fact that a phase current flows through the phase-current detection resistance Ru via a diode even during the dead time period. Namely, the sampling period corresponds to the time period from t3 to t7. This can lengthen the sampling period by the dead time period (from t3 to t4, from t6 to t7) designated by diagonal lines in FIG. 8(e), in comparison with the conventional sampling period from t4 to t6. This enables detecting the phase currents with accuracy improved by the lengthened sampling period, which can improve the S/N ratio of detection values In, thereby improving the accuracy of the control of the motor 4.

On the other hand, in FIG. 8, as illustrated in (a) and (b), during the time period from t3 to t7 when the U-phase upper switching device Q1 is off, the U-phase lower switching device Q2 is on. In this case, as previously described, the voltage across the phase-current detection resistance Ru induced by the current flowing through the switching device Q2 is sampled by the sample-and-hold circuit 5u during the time period when the U-phase lower switching device Q2 is on (from t4 to t6), while the voltage across the phase-current detection resistance Ru induced by the current flowing through the diode D2 is sampled by the sample-and-hold circuit 5u during the dead time period (from t3 to t4 and from t6 to t7).

Figure 9:
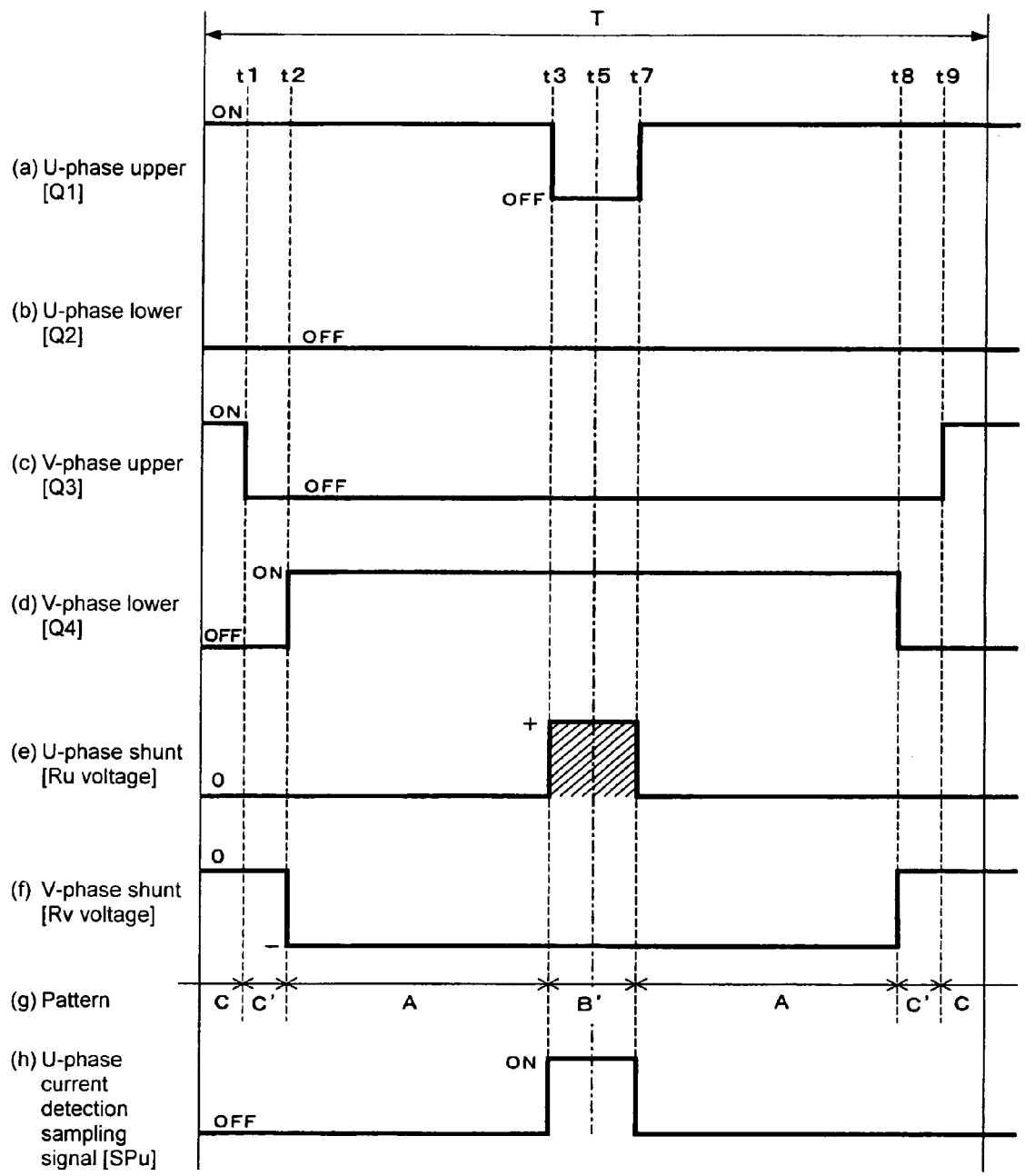
FIG. 9 shows another time chart for describing detection of the U-phase electric current.
Figure 10A:
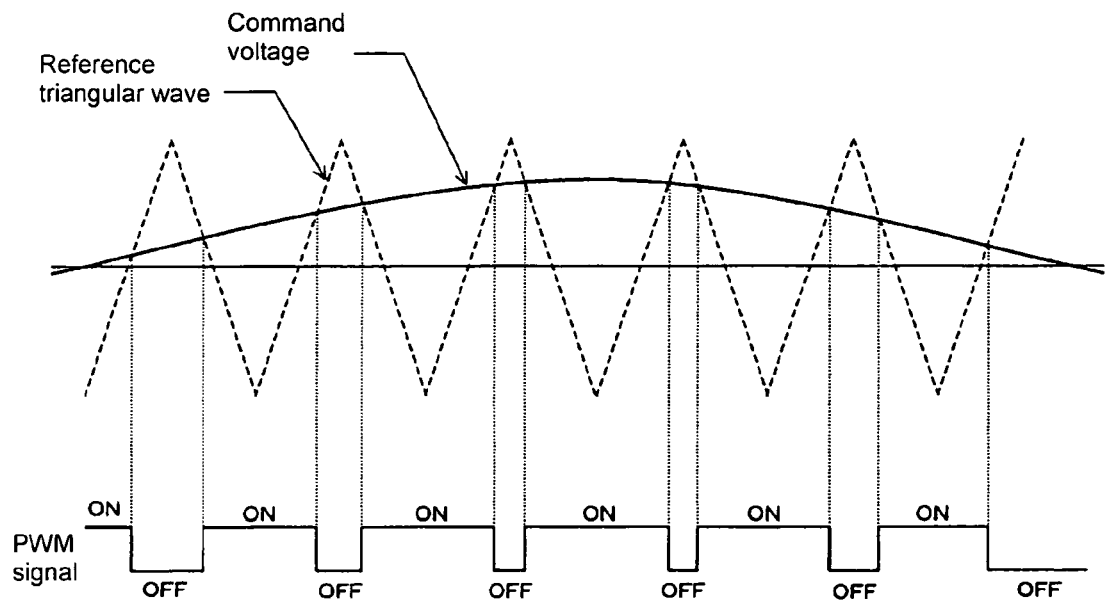
FIG. 10 shows a view for describing on/off time periods of PWM signals.
Figure 10B:
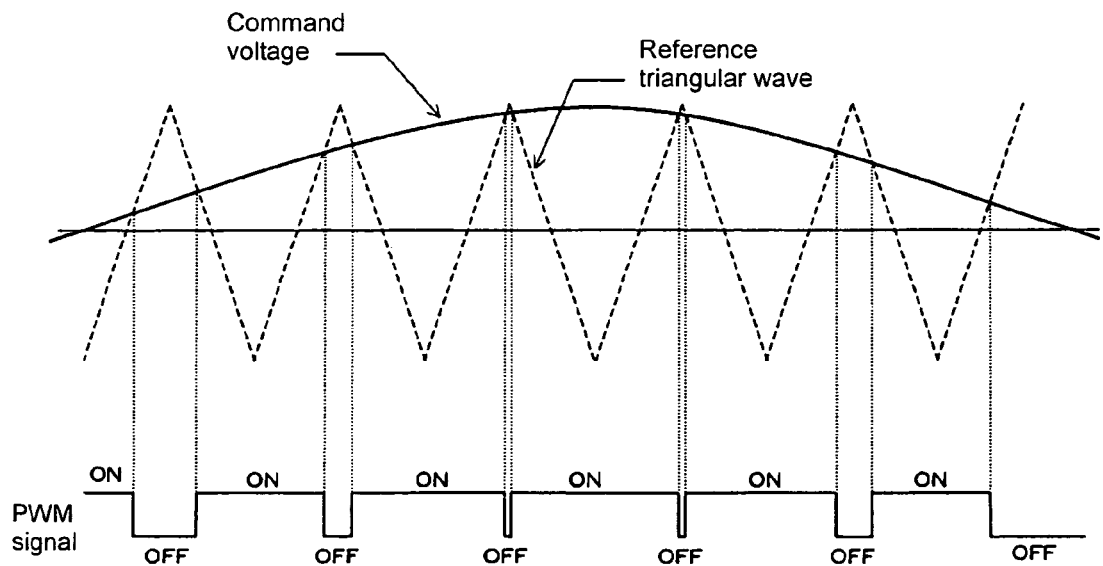

However, the on/off relationship between the switching devices Q1 and Q2 is not necessarily limited to that in FIGS. 8(a) and (b), but there may be a case where the switching device Q2 is not on within the time period when the switching device Q1 is off. FIG. 9 illustrates a time chart of such a case. In FIG. 9, as in (a), the time period from t3 to t7 when the switching device Q1 is off is only the dead time period due to an increase of the duty ratio of the U-phase upper switching device Q1 (the on time period being lengthened), which eliminates the on time period of the U-phase lower switching device Q2. Such a phenomenon occurs in a case where the amplitude of command voltage is increased. This will be described with reference to FIG. 10. A PWM signal is created based on level comparison between a command voltage and a reference triangular wave, and the PWM signal is on during the time period when the command voltage is greater than the reference triangular wave, while the PWM signal is off during the time period when the command voltage is not greater than the reference triangular wave. Accordingly, when the command voltage has a greater amplitude as in (b), the PWM signal has a shorter off time period, in comparison with the off time period of the PWM signal of when the command voltage has a smaller amplitude as in (a), and only extremely short off time periods can be generated in some time periods, as in FIG. 9(a).

In cases where the U-phase lower switching device Q2 is not on within the time period when the U-phase upper switching device Q1 is off, as described above, it has been impossible to detect the U-phase current with conventional methods. On the other hand, with the preferred embodiment, even when the switching device Q2 is not on within the time period when the switching device Q1 is off, it is possible to detect the phase current at least during the dead time period, by using the fact that an electric current flows through the phase-current detection resistance Ru, in a case of the aforementioned pattern B' (FIG. 6). Hereinafter, this will be described based on FIG. 9.

In FIG. 9, the operation until the timing t3 and the operation after the timing t7 are completely the same as those in FIG. 8. Accordingly, there will be described only the operation during the time period from t3 to t7, hereinafter. At the timing t3, as in (a), the U-phase upper switching device Q1 is off, thereby changing the conduction state pattern to B' (FIG. 6). At this time, a phase current flows through the phase-current detection resistance Ru via the diode D2, thereby inducing a voltage having the positive polarity between the opposite ends of the resistance Ru, as in (e). Therefore, as in (h), at the time point t3, a sampling signal SPu is output from the control portion 1, which causes the sample-and-hold circuit 5u to start sampling of the voltage across the resistance Ru. Thereafter, on reaching a dead time period when both the U-phase upper and lower switching devices Q1 and Q2 are off, sampling is continuously conducted during this time period. If the timing t7 comes after the timing t5 without turning on the U-phase lower switching device Q2, as in (a), the conduction state pattern is changed to A (FIG. 3), since the U-phase upper switching device Q1 is on. At this time, a phase current no longer flows through the phase-current detection resistance Ru, thereby changing the voltage between the opposite ends of the resistance to zero as in (e). Thus, as in (h), at the time point t7, the control portion 1 stops outputting of the sampling signal SPu to stop sampling, and samples and holds the voltage across the resistance Ru. The sampled-and-held voltage is amplified by the DC amplification circuit 6u to be output as a phase-current detection value Iu.

As described above, in a case of FIG. 9, even if the off time period of the U-phase upper switching device Q1 is decreased and the U-phase lower switching device Q2 is not on within this time period, a voltage is generated across the phase-current detection resistance Ru due to the electric current flowing through the diode D2 during the dead time period (the off time period of Q1) designated by diagonal lines in (e), and this voltage is sampled by the sample-and-hold circuit 5u, which enables detection of the U-phase current even through the U-phase lower switching device Q2 is off. This can lengthen the sampling period, which enables detecting the phase current with higher accuracy and improving the S/N ratio of the detection value Iu. This enables controlling the motor 4 with higher accuracy.

Figure 11:
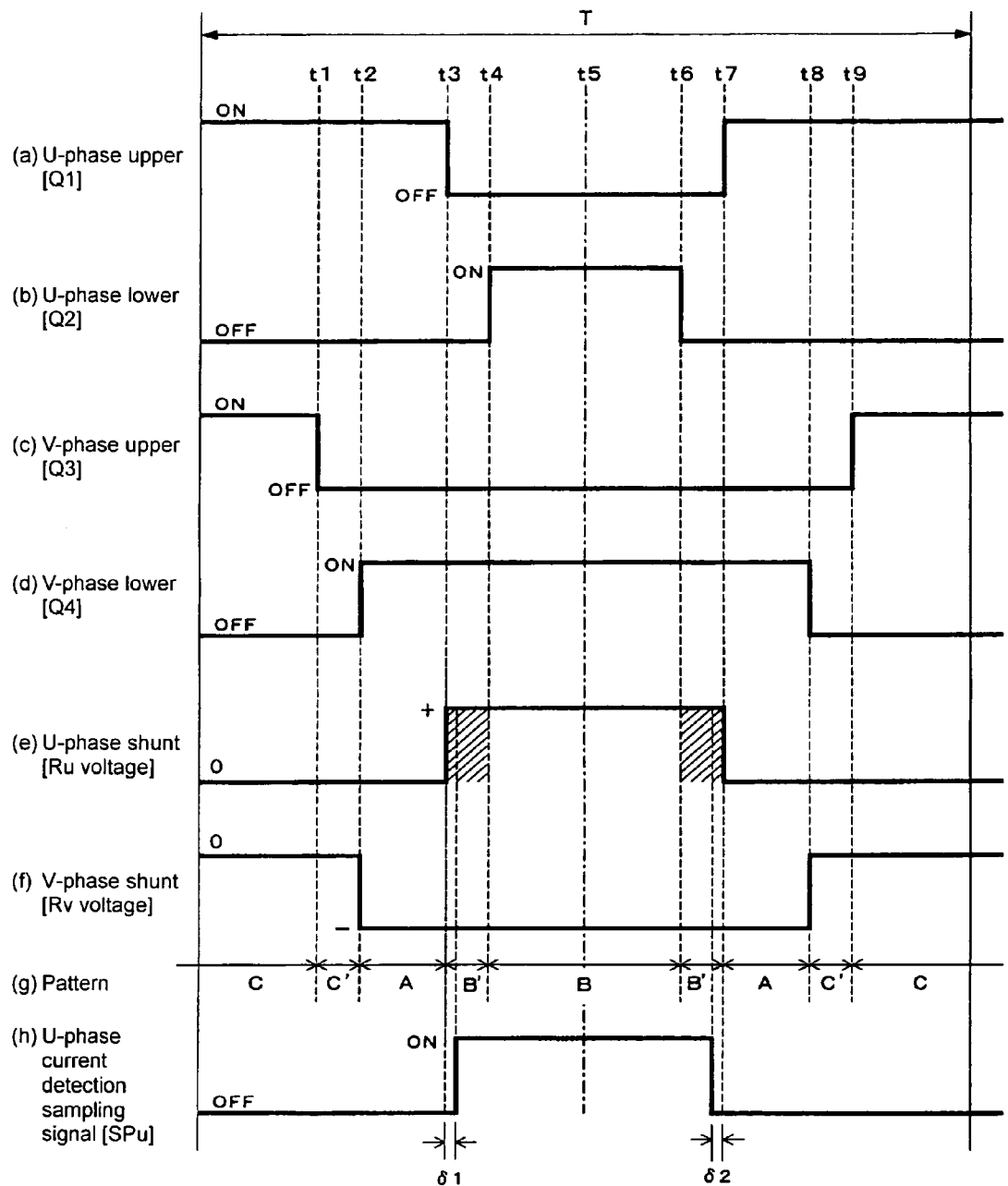
FIG. 11 shows a time chart according to another embodiment.

Next, there will be described other embodiments of the present invention. While, in the aforementioned FIG. 8, a sampling signal SPu is output at the timing t3 when the U-phase upper switching device Q1 is off and the sampling signal SPu is stopped at the timing t7 when the U-phase upper switching device Q1 is on, a sampling signal SPu can also be output later than the timing t3 when the U-phase upper switching device Q1 is off by a certain time period δ1, and the sampling signal SPu can be stopped earlier than the timing t7 when the U-phase upper switching device Q1 is on by a certain time period δ2, as in FIG. 11(h). The δ1 and δ2 can have either the same value or different values.

Figure 12:
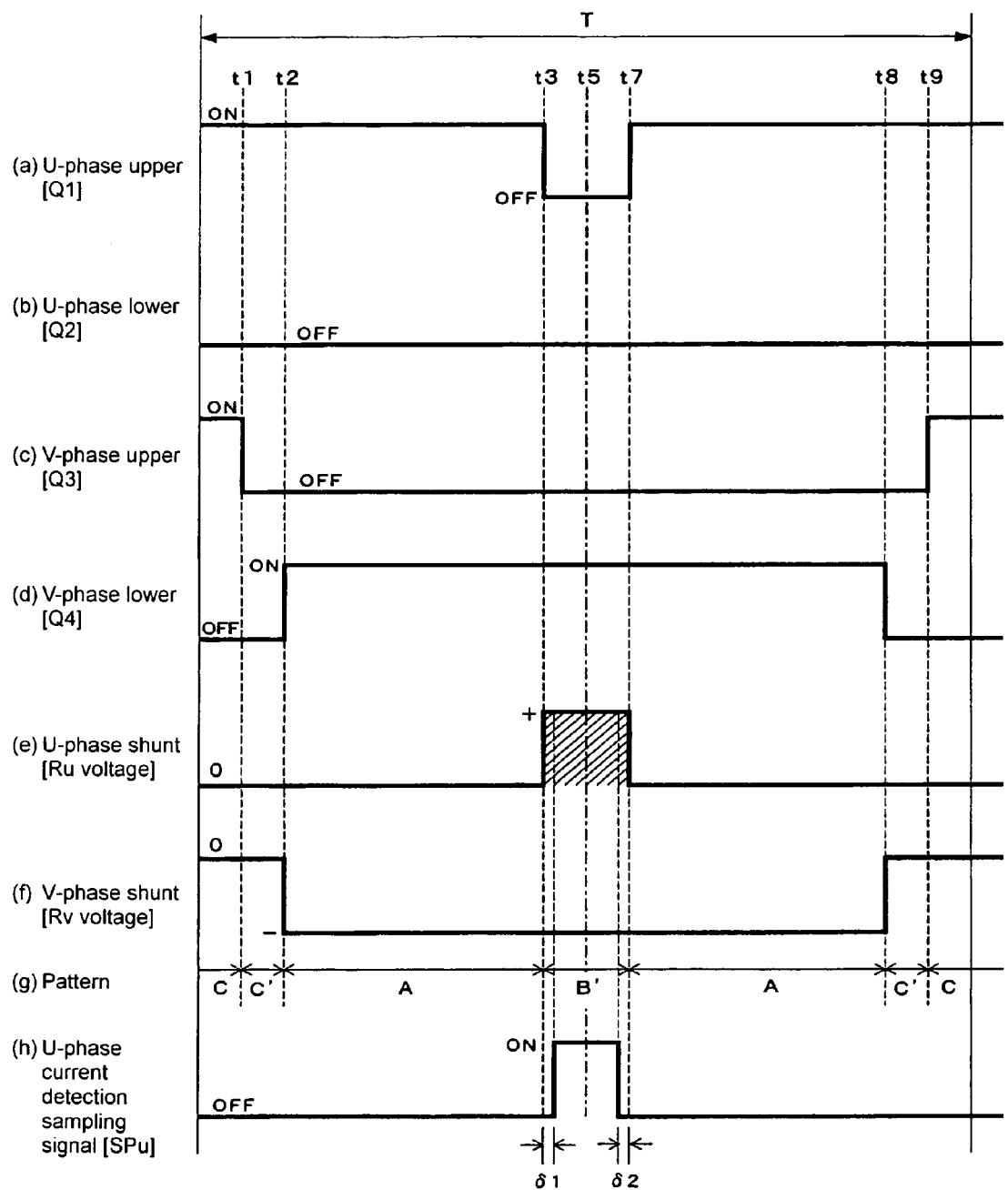
FIG. 12 shows a time chart according to still another embodiment.

Similarly, while, in the aforementioned FIG. 9, a sampling signal SPu is output at the timing t3 when the U-phase upper switching device Q1 is off and the sampling signal SPu is stopped at the timing t7 when the U-phase upper switching device Q1 is on, a sampling signal SPu can also be output later than the timing t3 when the U-phase upper switching device Q1 is off by a certain time period δ1, and the sampling signal SPu can be stopped earlier than the timing t7 when the U-phase upper switching device Q1 is on by a certain time period δ2, as in FIG. 12(h). The δ1 and δ2 can have either the same value or different values.

By starting sampling later than the time point when the U-phase lower switching device Q1 is off and stoping sampling earlier than the time point when the U-phase lower switching device Q1 is on, as described above, it is possible to prevent noises generated at the time of on/off operations of the switching device Q1 from being sampled and held, which can improve the S/N ratio, thereby enabling more accurate feedback control.

While, in the aforementioned embodiments, there have been exemplified a brushless motor as the motor 4, the present invention can be generally applied to inverter devices for use in driving motors having plural phases, such as induction motors and synchronous motors.

Further, while, in the aforementioned embodiments, there have been exemplified a case where the present invention is applied to an electric power steering device for a vehicle, the present invention can be applied to inverter devices used in other devices.

According to the preferred embodiments, it is possible to detect the phase current even during the dead time period, thereby lengthening the sampling period to enable feedback control with higher accuracy.

What is claimed is:

1. An inverter device comprising:
an inverter circuit including pairs of upper and lower arms provided in association with respective plural phases, the inverter circuit being constituted such that the respective arm has a switching device and a diode connected in parallel with the switching device, the respective lower arm for the respective phase has a phase-current detection resistance provided in serial to the switching device for detecting a phase current in a motor, and a voltage for driving the motor is extracted from a connection point between the upper and lower arms for the respective phase;
a PWM circuit for supplying a PWM (Pulse Width Modulation) signal having a predetermined duty ratio to the respective switching device in the inverter circuit; and
a sample-and-hold circuit for, when the switching device in the lower arm is on by the PWM signal from the PWM circuit, sampling a voltage across the phase-current detection resistance induced by an electric current flowing through the switching device and sampling and holding the sampled voltage; wherein during a dead time period when both the respective switching devices in the upper arm and the lower arm for one of the phases are off, the sample-and-hold circuit samples the voltage across the phase-current detection resistance inducted by the electric current flowing through the diode connected in parallel with the switching device in the lower arm, and samples and holds the sampled voltage.

2. An inverter device according to claim 1, wherein
the sample-and-hold circuit performs the sampling during the dead time period, in a case where the duty ratio of the PWM signal supplied from the PWM circuit to the switching device in the upper arm is at least 50% and the duty ratio of the PWM signal supplied to the switching device in the lower arm is less than 50%.

3. An inverter device according to claim 2, wherein
when the switching device in the lower arm is on within a period when the switching device in the upper arm is off, the sample-and-hold circuit samples the voltage across the phase-current detection resistance induced by the electric current flowing through the switching device during the period when the switching device in the lower arm is on, and samples the voltage across the phase-current detection resistance induced by the electric current flowing through the diode connected in parallel with the switching device during the dead time period.

4. An inverter device according to claim 3, wherein
the sample-and-hold circuit starts sampling later than a time point when the switching device in the upper arm is off, and stops sampling earlier than a time point when the switching device in the upper arm is on.

5. An inverter device according to claim 2, wherein
when the switching device in the lower arm is not on within a period when the switching device in the upper arm is off, the sample-and-hold circuit samples the voltage across the phase-current detection resistance induced by the electric current flowing through the diode connected in parallel with the switching device in the lower arm during the dead time period.

6. An inverter device according to claim 5, wherein
the sample-and-hold circuit starts sampling later than a time point when the switching device in the upper arm is off, and stops sampling earlier than a time point when the switching device in the upper arm is on.

7. An inverter device according to claim 2, wherein
the sample-and-hold circuit starts sampling later than a time point when the switching device in the upper arm is off, and stops sampling earlier than a time point when the switching device in the upper arm is on.

8. An inverter device according to claim 1, wherein
the sample-and-hold circuit starts sampling later than a time point when the switching device in the upper arm is off, and stops sampling earlier than a time point when the switching device in the upper arm is on.

* * * * *